June 27, 1933.  H. F. SHINDEL  1,915,552
PIPE COUPLING
Filed June 9, 1931
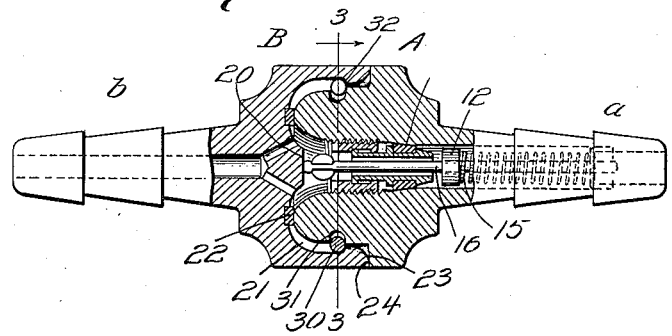
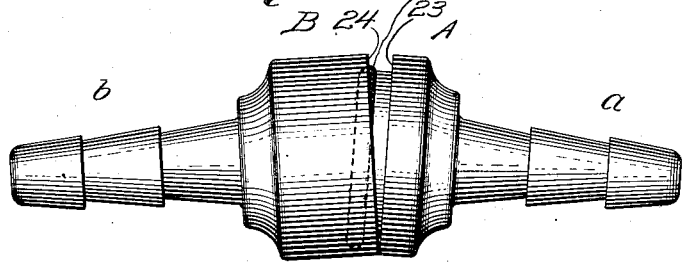
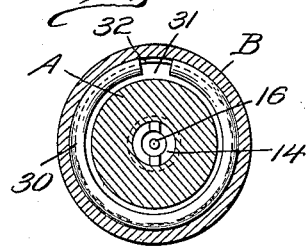
Harry F. Shindel Inventor
By
Attorney Patented June 27, 1933

1,915,552

UNITED STATES PATENT OFFICE

HARRY F. SHINDEL, OF READING, PENNSYLVANIA, ASSIGNOR TO WILLSON PRODUCTS, INC., OF READING, PENNSYLVANIA, A CORPORATION OF PENNSYLVANIA

PIPE COUPLING

Application filed June 9, 1931. Serial No. 543,040.

This invention relates particularly to pipe couplings comprising coacting members one of which is provided with a normally closed fluid-control valve and the other of which is adapted to open said valve automatically in the act of effecting the coupling; my main object being to provide an improved device in which the members are conveniently separable so as to enable easy and satisfactory coupling and uncoupling thereof coincidently with the automatic opening and closing of the valve. The invention is fully described in connection with the accompanying drawing illustrating its preferred application to a well known type of pneumatic air valve, and the novel features are clearly pointed out in the subjoined claims.

Fig. 1 is a sectional longitudinal view showing the two members in fully coupled-together relation, with the control valve of the one member held open for passage of fluid; the known "valve insides" of said member being only suggestively indicated.

Fig. 2 is an exterior view showing the two members in the act of separation; their axes being inclined as is required to conveniently break the coupling.

Fig. 3 is a plan view of the coupling ring, shown as mounted upon its carrying member with the front portion of the latter broken away.

The coupling members, as illustrated, are provided with similar hose-connecting shank portions $a$ and $b$, and with complementary coupling heads A and B; one of the members having an axial spring-seated control valve 12, and the other an axially fixed valve-operating projection 20, as heretofore employed in valved pipe couplings. The valve 12 is shown as axially mounted in the coupling member A$a$, in connection with known "insides" comprising a screwed-in valve seat, spring 15, and contact stem 16, as employed in the so-called "Schrader valve" for pneumatic tires; it being understood that the particular mounting of said axially movable valve is immaterial to the present invention.

The opposed coupling head B, as shown, is of cylindrical form, with a cylindrical socket-recess 21 having an apertured base portion from which the valve-operating projection 20 fixedly projects centrally. This base portion is preferably provided with a concentric rubber washer 22 which forms a yielding seat for the end of the coacting coupling head A when the members are fully coupled together, so as to insure against leakage.

The socket-engaging portion of the valved coupling head A is sized to loosely enter the cylindrical socket-recess 21 so as to bring its rounded end into seating contact with said rubber washer 22; and a circular flange 23 is formed at the base of said socket-engaging portion of the coupling head A, and is so arranged relative to the washer-seating end thereof and to the depth of the socket-recess 21 in the head B, that seating of the annular rim 24 of the latter upon said flange 23 will occur when said rubber washer 22 is slightly compressed to insure tightness between the heads A and B while the valve 12 is held open.

For automatically coupling the heads A and B, after they are thus axially pressed together to open the valve 12, I employ a resilient coupling-ring 30; which ring is loosely carried upon the head A when the members are separated, but is arranged to lock them against unintended axial movement when they have been fully engaged, though permitting of easy breaking of the coupling when desired. To accomplish this the split round-wire ring 30, is shown engaged in an external groove 31 of the head A, so as to be loosely retained at a determined distance from the flange 23; and a cooperating circular stop-shoulder 32 is formed on the inner wall of the socket-recess 21 of member B, at a corresponding distance from the rim 24 of the latter; so that when the members A and B are axially engaged so as to abut exteriorly at said flange 23 and interiorly at the base 22 of the socket-recess 21, with the valve 15 opened, the split coupling ring 30 will,—after being first closed together in the sufficiently deep groove 31 to permit of full axial engaging movement of the members A and B,—resiliently expand so as to engage the stop-shoulder 32 of the recesss wall and so hold the members in their set axial relation against any accidental uncoupling strain. At the same time however, intended uncoupling or breaking of the connection is conveniently enabled by utilizing the flange 23 as a fulcrum for effecting the angular spreading-apart of the heads with inclining of the axes of the members, by lateral pressure, as indicated in Fig. 2; the round cross-section of the coupling ring 30, and looseness in the fit of the engaging members, enabling sufficient compression of the split ring into the groove 31, by a moderate breaking force thus laterally exerted, to permit freeing of the head B from the coupling ring as shown.

It will be understood that coupling of the two members is effected by simply forcing them together axially until the coupling ring is engaged simultaneously with full opening of the valve and sealing against leakage; and that the leverage provided by the fulcruming flange 23 enables easy breaking of the coupling by lateral bending action. The preferred construction specifically set forth may obviously be modified without departing from the invention as defined in the claims.

What I claim is:

1. A pipe coupling comprising axially engageable members provided respectively with an axially movable normally seated valve and a fixed valve-operating projection; a split coupling ring collapsibly engaged in a groove formed on the head of one of said members; the other member having a cylindrical recess for receiving the head of said first member; and an interior shoulder on said recessed member adapted to engage said ring for holding said members against axial separation when the members are axially engaged to unseat said valve; a rim on said recessed member; and a flange adjacent the head of said ring-carrying member engaged by said rim and serving as a fulcrum for breaking said coupling by angular movement of said members about the axis of said coupling.

2. A pipe coupling comprising axially engageable members provided respectively with an axially movable normally seated valve and a fixed valve-operating projection; a split coupling ring collapsibly engaged in a groove formed on the head of one of said members; the other member having a cylindrical recess for receiving the head of said first member; an interior shoulder on said recessed member adapted to engage said ring for holding said members against axial separation when the members are axially engaged to unseat said valve; an annular rim determinedly spaced from said shoulder on said recessed member; and a flange correspondingly spaced from the split ring carried by said other member for contacting engagement by said rim to break said coupling by exerting force against said rim on angular movement of said members about the axis of said coupling with said flange serving as a fulcrum.

In testimony whereof I affix my signature.

HARRY F. SHINDEL.